J. H. GREENE.
STAFF HOLDER AND SPOT MARKER.
APPLICATION FILED MAY 21, 1917.
1,257,215.
Patented Feb. 19, 1918.
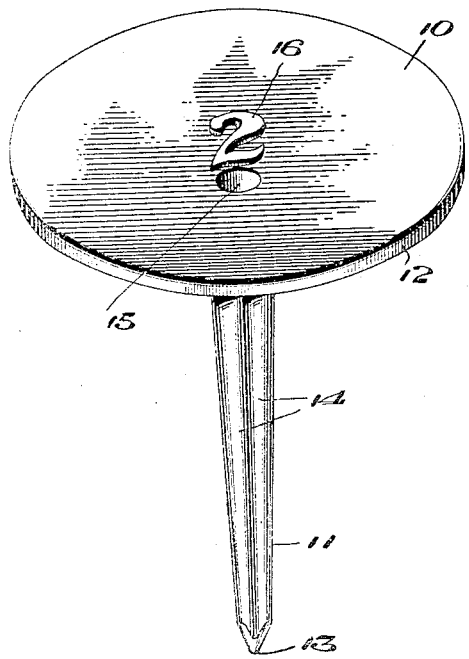
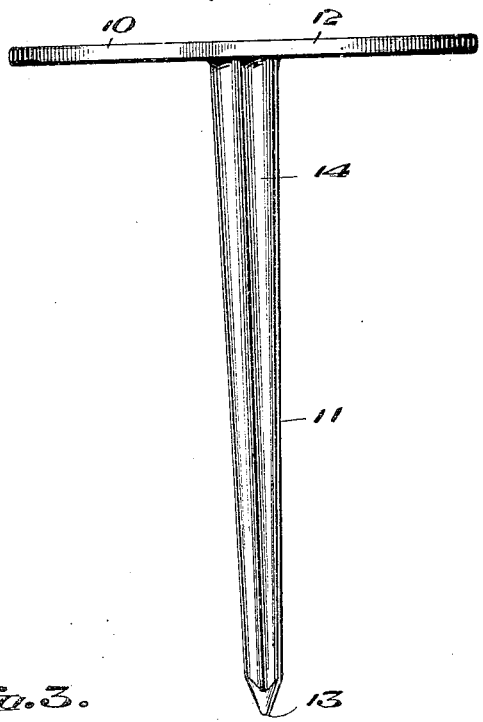
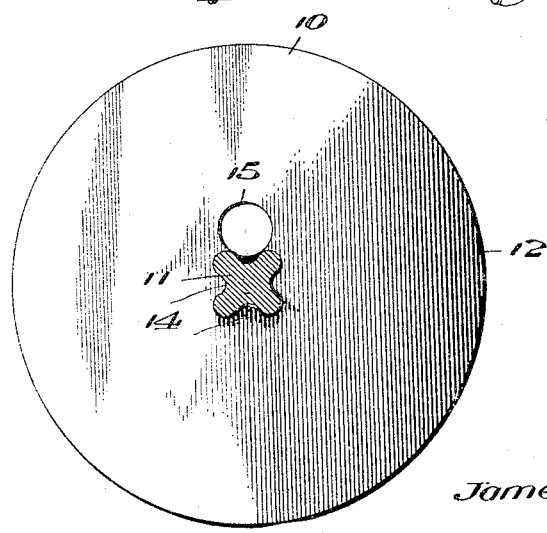
Witnesses
Philip E. Barnes
Dorothy V. Aplin
Inventor
James H. Greene
By Henry P. Alden
Attorney

UNITED STATES PATENT OFFICE.

JAMES H. GREENE, OF BROOKLINE, MASSACHUSETTS.

STAFF-HOLDER AND SPOT-MARKER.

1,257,215.  Specification of Letters Patent. Patented Feb. 19, 1918.

Application filed May 21, 1917. Serial No. 169,990.

*To all whom it may concern:*

Be it known that I, JAMES H. GREENE, a citizen of the United States, residing at Brookline, in the county of Norfolk and State of Massachusetts, have invented new and useful Improvements in Staff-Holders and Spot-Markers of which the following is a specification.

This invention relates to certain new and useful improvements in staff-holders and spot-markers, and has more especial reference to such a device as is particularly designed for placement about graves or other places which it is desired to mark with appropriate identification data and to decorate with staffed flags, stemmed vases and the like.

An object of the invention is to provide means for the easy accomplishment of the functions specified which is simple, efficient and economical in construction and which when properly positioned at the desired point will not in any wise interfere with the maintenance, care and beauty of the lawn thereabout.

Other and further objects and advantages of the invention will be hereinafter set forth and the novel features thereof defined by the appended claims.

In the drawing—

Figure 1 represents a perspective view of the device looking down upon the same;

Fig. 2 is a side elevation; and

Fig. 3 is an inverted plan of the device, the stem being indicated in cross section.

Like numerals of reference refer to like parts in the several figures of the drawing.

Referring to the drawing, an article of manufacture, made from any suitable material such as iron or other metal, is illustrated wherein the numeral 10 represents a flat plate or body portion, and 11 an elongated, solid, integral stem depending centrally therefrom. As shown, the portion 10 is indicated as having a circular contour or edge 12, though it will of course be understood that any other marginal configuration may be resorted to without departing from the spirit of the invention. The centrally depending stem 11 tapers slightly from its connection with the portion 10 to a point adjacent its lower free end from whence it terminates in a sharpened extremity 13 to facilitate its penetration into the ground.

By referring to the drawing, it will be seen that the stem 11 is provided with several grooves or depressions 14 spaced about its periphery and extending substantially throughout the longitudinal dimension of the stem. An aperture, indicated by the numeral 15, of suitable size and shape is formed in the plate portion to one side of the center thereof and so that the portion of the plate surrounding the aperture and which is disposed in closest proximity to the stem, practically forms a continuation of one of the grooves or depressions 14 in the stem. If desired, the portion 10 may be provided with several apertures corresponding in number with the number of grooves or depressions in the stem, each of said apertures being positioned with respect to one of said grooves as has just been described On the upper face of the plate may be placed, printed, carved or otherwise fashioned identification data such as that represented by the numeral 16 whereby the grave or spot may be suitably marked.

Heretofore, devices have been used for the purpose of retaining in upright position flag-staffs, vases and similar tokens of remembrance placed by friends and relatives about the last resting place of the departed; but due to the fact that some portion or portions of such devices project above the ground, they are blown down by the wind, removed by attendants caring for the premises, and so, soon become lost. This invention eliminates these objectionable possibilities for, as will be appreciated, when the stem of the device is forced into the ground so that the plate is caused to contact therewith, or if desired countersunk slightly therein, there is no portion which can possibly offer resistance to the elements or which will interfere with the passage thereover of a lawn mower, rake or similar tool. The staff of a flag may be readily inserted through the aperture formed in the plate and being partially, at least, surrounded by the grooved stem is afforded ample support whereby it may be maintained indefinitely in upright position.

Having described my invention, what I desire to secure by Letters Patent is:

1. A device of the type described comprising a member having a longitudinally extending groove formed in its contour adapted for insertion into the ground, and a portion at one extremity of said member adapted to engage the ground surface and coöperating with the groove in the member and the ground adjacent thereto to maintain a staff in vertical position.

2. A device of the type described comprising a stem having a longitudinally extending groove formed in its contour adapted for insertion into the ground, and a portion at one extremity of the stem, adapted to flatly engage the ground surface, said portion having an aperture in substantial alinement with the groove for receiving a staff and coöperating with the ground in proximity thereto to support the same in vertical position.

3. As an article of manufacture consisting of a stem having a longitudinally extending groove formed in its periphery adapted for insertion into the ground, and a plate member integrally formed at one extremity of the stem adapted to flatly engage the ground surface, said plate member having an aperture in substantial alinement with the groove for receiving a staff and coöperating with the ground in proximity thereto to support the staff in vertical position.

4. As an article of manufacture consisting of a plate member having an aperture adapted to flatly engage the ground surface, and an integral stem depending centrally therefrom, adapted for insertion into the ground, said stem being provided with a longitudinally extending groove in its contour and in alinement with the aperture for receiving a staff and co-acting with the ground in proximity thereto to support the staff in vertical position.

JAMES H. GREENE.

Copies of this patent may be obtained for five cents each, by addressing the "Commissioner of Patents, Washington, D. C."